US010760612B1

(12) United States Patent
Slob et al.

(10) Patent No.: US 10,760,612 B1
(45) Date of Patent: Sep. 1, 2020

(54) SLEW BEARING, METHOD FOR USING A SLEW BEARING, HOISTING CRANE AND VESSEL

(71) Applicant: ITREC B.V., Schiedam (NL)

(72) Inventors: Wouter Johannes Slob, Schiedam (NL); Hubertus Lourens Leendert Tieleman, Schiedam (NL); Joop Roodenburg, Schiedam (NL); Teunis Van Der Hoek, Schiedam (NL)

(73) Assignee: ITREC B.V., Schiedam (NL)

( * ) Notice: Subject to any disclaimer, the term of this patent is extended or adjusted under 35 U.S.C. 154(b) by 144 days.

(21) Appl. No.: 16/093,463

(22) PCT Filed: Apr. 17, 2017

(86) PCT No.: PCT/NL2017/050239
§ 371 (c)(1),
(2) Date: Oct. 12, 2018

(87) PCT Pub. No.: WO2017/179986
PCT Pub. Date: Oct. 19, 2017

(30) Foreign Application Priority Data

Apr. 15, 2016 (NL) ..................................... 2016617

(51) Int. Cl.
*F16C 19/30* (2006.01)
*B66C 23/84* (2006.01)
(Continued)

(52) U.S. Cl.
CPC .............. *F16C 19/30* (2013.01); *B66C 23/52* (2013.01); *B66C 23/62* (2013.01); *B66C 23/84* (2013.01);
(Continued)

(58) Field of Classification Search
CPC ...... F16C 19/30; F16C 19/305; F16C 19/381; F16C 19/38; F16C 21/00; F16C 35/062;
(Continued)

(56) References Cited

U.S. PATENT DOCUMENTS 2,219,031 A * 10/1940 Harold Frauenthal ......................
F16C 33/6681
384/572
2,643,920 A * 6/1953 Olszewski ............ F16C 19/522
384/619
(Continued)

FOREIGN PATENT DOCUMENTS

WO WO 2015/060720 A1 4/2015
WO WO 2015/088332 A1 6/2015

OTHER PUBLICATIONS

International Search Report, issued in PCT/NL2017/050239, dated Sep. 4, 2017.
(Continued)

*Primary Examiner* — Michael E Gallion
(74) *Attorney, Agent, or Firm* — Birch, Stewart, Kolasch & Birch, LLP (57) ABSTRACT

A slew bearing includes a stationary bearing ring to be fixed to a base, a moveable bearing ring to be fixed to a moveable object, wherein the stationary bearing ring and the moveable bearing ring are configured to enable rotation of the moveable bearing ring relative to the stationary bearing ring about a rotation axis. A main axial bearing and an auxiliary bearing are provided between the stationary bearing ring and the moveable bearing ring, wherein the moveable bearing ring includes one or more main portions and one or more auxiliary portions, which one or more main portions are moveable relative to the one or more auxiliary portions between an operational position, in which the main axial bearing transfers the axial loads between moveable bearing (Continued)

ring and stationary bearing ring, and a maintenance position, in which the auxiliary axial bearing transfers the axial loads between moveable bearing ring and stationary bearing ring and the main bearing is allowed to be inspected and/or maintained so that the slew bearing during inspection and/or maintenance is still operational.

15 Claims, 8 Drawing Sheets

(51) Int. Cl.
*B66C 23/52* (2006.01)
*B66C 23/62* (2006.01)
*F16C 21/00* (2006.01)
*F16C 39/02* (2006.01)
*F16C 35/06* (2006.01)
*B63B 25/08* (2006.01)
*B63B 27/34* (2006.01)

(52) U.S. Cl.
CPC ............ *F16C 21/00* (2013.01); *F16C 35/062* (2013.01); *F16C 39/02* (2013.01); *B63B 25/08* (2013.01); *B63B 27/34* (2013.01); *F16C 2237/00* (2013.01); *F16C 2300/14* (2013.01)

(58) Field of Classification Search
CPC .. F16C 39/02; F16C 2237/00; F16C 2300/14; B66C 23/52; B66C 23/62; B63B 25/08; B63B 27/34
See application file for complete search history.

(56) References Cited

U.S. PATENT DOCUMENTS

| | | | | |
|---|---|---|---|---|
| 4,582,436 | A * | 4/1986 | Merron | E02F 9/121 384/593 |
| 5,893,784 | A * | 4/1999 | Boatman | B63B 21/507 441/3 |
| 8,540,092 | B2 * | 9/2013 | Roodenburg | B66C 23/52 212/253 |
| 8,550,266 | B2 * | 10/2013 | Settlemier | B66C 23/08 212/195 |
| 10,399,830 | B2 * | 9/2019 | De Groot | B66C 23/84 |
| 2004/0164040 | A1 * | 8/2004 | Delago | F16C 19/50 212/253 |
| 2009/0324151 | A1 * | 12/2009 | Craig | F16C 19/52 384/448 |
| 2016/0368743 | A1 * | 12/2016 | De Groot | F16C 19/30 |

OTHER PUBLICATIONS

Written Opinion of the International Searching Authority, issued in PCT/NL2017/050239, dated Sep. 4, 2017.

* cited by examiner

SLEW BEARING, METHOD FOR USING A SLEW BEARING, HOISTING CRANE AND VESSEL

The invention relates to a slew bearing, a method for using a slew bearing, a hoisting crane and a vessel.

Slew bearings are known to allow large structures to rotate relative to a base about a substantially vertical rotation axis while transmitting weight loads, tilting loads and/or radial loads between the large structure and the base.

An example of such a large structure is a hoisting crane which is a large type crane that is for example used in the off shore industry. Hoisting cranes have a crane structure comprising a crane housing and a jib, which jib is often configured to be pivoted about a substantially horizontal axis. The slew bearing is then provided between the crane housing and a base supporting the crane structure allowing the crane structure and thus the jib to be rotated about a vertical rotation axis.

Another example of such a large structure is a turret as for instance used in floating production, storage and offloading vessels, wherein a slew bearing is arranged between the turret and the hull of the vessel to allow weathervaning in which the vessel will normally lay head to the prevailing environment.

A drawback of slew bearings, especially large slew bearings that have to transmit relatively large loads, is that inspection and/or maintenance of the bearing may be regularly required to determine whether the slew bearing is still functioning properly and/or to keep the slew bearing in good condition. However, to allow inspection and/or maintenance, a part of or even the entire slew bearing needs to be dismantled to allow personnel access to the interior components of the slew bearing requiring inspection and/or maintenance. During this period, the slew bearing cannot perform its function and the large structure supported thereby are non-operational.

It is therefore an object of the invention to provide a slew bearing which requires less downtime as a result of inspection and/or maintenance.

This object is achieved by a slew bearing according to claim 1, comprising:
- a stationary bearing ring to be fixed to a base;
- a moveable bearing ring to be fixed to a moveable object and which moveable bearing ring is concentric with the stationary bearing ring, wherein the stationary bearing ring and the moveable bearing ring are configured to enable rotation of the moveable bearing ring relative to the stationary bearing ring about a rotation axis, wherein the slew bearing further comprises an upper main axial bearing having a row of axial load rollers, which rollers are arranged between a top roller raceway and a bottom roller raceway, said top roller raceway being connected to the moveable bearing ring and said bottom roller raceway being connected to the stationary bearing ring, and said rollers configured to transfer axial loads parallel to the rotation axis between the moveable bearing ring and the stationary bearing ring, wherein the slew bearing further comprises an upper auxiliary axial bearing having upper low-friction pads arranged on the moveable bearing ring and corresponding lower low-friction pads arranged on the stationary bearing ring to engage with the upper low-friction pads, wherein the upper low-friction pads are arranged parallel to the top roller raceway, and the lower low-friction pads are arranged parallel to the bottom roller raceway in order to transfer axial loads parallel to the rotation axis between the moveable bearing ring and the stationary bearing ring when the upper and lower low-friction pads engage with each other, wherein the moveable bearing ring comprises one or more main portions with at least a part of the top roller raceway of the upper main axial bearing and one or more corresponding auxiliary portions, each auxiliary portion comprising at least a part of the upper low-friction pads, wherein the one or more main portions are moveable relative to the corresponding one or more auxiliary portions between an operational position, in which the at least part of the top roller raceway engages with axial load rollers to transfer axial loads between the moveable bearing ring and the stationary ring, and a maintenance position, in which the at least part of the top roller raceway is disengaged from the axial load rollers, and wherein the one or more auxiliary portions are configured such that the at least part of the upper low-friction pads are engageable with lower low-friction pads when the corresponding one or more main portions are in the maintenance position to transfer axial loads between the moveable bearing ring and the stationary ring.

The advantage of the slew bearing according to the invention is that at least a part of the top roller raceway can be disengaged from the rollers for inspection of and/or maintenance to the upper main axial bearing while the corresponding loss of transferability of axial loads is compensated for by the upper auxiliary axial bearing so that during the inspection and/or maintenance the slew bearing is still operational although in some applications or embodiments it may be preferred to perform inspection and/or maintenance during favourable conditions as the full capacity of the slew bearing may not be available.

In an embodiment, an actuator device is provided to move the one or more main portions between the operational position and the maintenance position.

In an embodiment, the moveable bearing ring comprises a single main portion and a single auxiliary portion, but it is also envisaged that a plurality of auxiliary portions are provided that are evenly distributed over the circumference of the moveable bearing ring, e.g. ten auxiliary portions of about one meter long every 36°.

In an embodiment, the one or more main portions comprise the entire top roller raceway so that the entire upper main axial bearing can be inspected and/or maintained at once. In case the one or more main portions comprise only a part of the entire roller raceway, all the rollers can be inspected and/or maintained by either pushing the rollers around or by rotating the large structure until the rollers of interest are located at a main portion in the maintenance position to allow access to these rollers of interest. In this way all the rollers can be inspected and/or maintained.

In an embodiment, the rollers are provided in a plurality of roller boxes, wherein preferably at least one of the roller boxes or the rollers contained therein is provided with a sensor for measuring a parameter or the condition of the slew bearing and a memory for storing measurement data. Providing a main portion in the maintenance position then allows to read out the memory to get offline access, e.g. by making a physical connection, to the measurement data omitting the need of (real-time) wireless communication. This also applies to applications that do not make use of roller boxes, but in which sensor and memory are provided in a single roller.

In an embodiment, the slew bearing comprises an inner main radial bearing provided between the stationary bearing ring and the moveable bearing ring on an inner side of the stationary bearing ring and/or an outer main radial bearing provided between the stationary bearing ring and the moveable bearing ring on an outer side of the stationary bearing ring.

In an embodiment, the inner main radial bearing and/or the outer main radial bearing are embodied as roller bearings comprising rollers arranged between a raceway on the moveable bearing ring and a raceway on the stationary bearing ring.

In an embodiment, the rollers of the inner main radial bearing and/or the outer main radial bearing are substantially held in position using an upper groove and a lower groove, wherein preferably the upper groove is provided in a cover element that is removable allowing for easy assembly. The upper and lower grooves are preferably arranged in the stationary bearing ring, but may alternatively be arranged on the moveable bearing ring.

The invention also relates to a hoisting crane comprising a crane structure, a slew platform supporting the crane structure, a base, and a slew bearing according to the invention, wherein the slew bearing is arranged between the base and the slew platform, wherein the stationary bearing ring is fixed to the base and the moveable bearing ring is fixed to the slew platform, thereby allowing the crane structure to rotate relative to the base about the rotation axis.

In an embodiment, the one or more main portions and the one or more auxiliary portions are fixed to the slew platform, wherein the one or more auxiliary portions can be disconnected from the slew platform, wherein an actuator device is provided between auxiliary portions and the slew platform to lift the slew platform including the one or more main portions when the one or more auxiliary portions are disconnected from the slew platform thereby allowing to move the one or more main portions between the operational position and the maintenance position.

The invention also relates to a vessel comprising a hull provided with an opening extending vertically through the hull, a turret extending in the opening of the hull, and a slew bearing according to the invention, wherein the slew bearing is arranged between the hull and the turret, wherein the stationary bearing ring is fixed to the hull and the moveable bearing ring is fixed to the turret, thereby allowing the turret to rotate relative to the hull about the rotation axis.

In an embodiment, the one or more main portions and the one or more auxiliary portions are fixed to the turret, wherein the one or more auxiliary portions can be disconnected from the turret, wherein an actuator device is provided between auxiliary portions and the slew platform to lift the slew platform including the one or more main portions when the one or more auxiliary portions are disconnected from the slew platform thereby allowing to move the one or more main portions between the operational position and the maintenance position.

The invention also relates to a method comprising the following steps:
a) providing a slew bearing according to the invention with the one or more main portions being directly or indirectly connected to the one or more auxiliary portions with the one or more main portions in the operational position;
b) disconnecting the one or more main portions from the one or more auxiliary portions;
c) moving the one or more main portions to the maintenance position.

In an embodiment, the method further comprises the step of performing inspection and/or maintenance on the upper main axial bearing, and subsequently moving the one or more main portions to the operational position followed by connecting the one or more main portions to the one or more auxiliary portions.

In an embodiment, the one or more main portions and the one or more auxiliary portions are connected to a moveable object, wherein disconnecting the one or more main portions from the one or more auxiliary portions comprises disconnecting the one or more auxiliary portions from the moveable object, and wherein moving the one or more main portions to the maintenance position is carried out by providing an actuator device between the disconnected one or more auxiliary portions and moving the moveable object with the actuator device.

The slew bearing can also be summarized as follows:
A slew bearing comprising:
a stationary bearing ring to be fixed to a base;
a moveable bearing ring to be fixed to a moveable object and which moveable bearing ring is concentric with the stationary bearing ring;
an upper main axial bearing arranged between the stationary bearing ring and the moveable bearing ring to transfer axial loads between the moveable bearing ring and the stationary bearing ring;
an upper auxiliary axial bearing arranged between the stationary bearing ring and the moveable bearing ring to transfer axial loads between the moveable bearing ring and the stationary bearing ring,
wherein the stationary bearing and the moveable bearing ring are configured to enable rotation of the moveable bearing ring relative to the stationary bearing ring about a rotation axis,
wherein the upper auxiliary axial bearing is arranged parallel to the upper main auxiliary bearing,
wherein the slew bearing has an operational configuration in which the main part of the axial loads are transferred between the stationary bearing ring and the moveable bearing ring by the upper main axial bearing,
and wherein the slew bearing has a maintenance configuration in which at least a part of the upper main axial bearing is accessible for maintenance and/or inspection and in which the loss of bearing capacity of the upper main axial bearing is at least partially compensated for by the upper auxiliary axial bearing.

Alternatively, the slew bearing can be described as follows:
A slew bearing comprising:
a stationary bearing ring to be fixed to a base;
a moveable bearing ring to be fixed to an object and which moveable bearing ring is concentric with the stationary bearing ring,
wherein the stationary bearing ring and the moveable bearing ring are configured to enable rotation of the moveable bearing ring relative to the stationary bearing ring about a rotation axis,
wherein the slew bearing further comprises a row of axial load rollers, which rollers are arranged between a top roller raceway and a bottom roller raceway, said top roller raceway being connected to the moveable bearing ring and said bottom roller raceway being connected to the stationary bearing ring, and said rollers configured to transfer axial loads parallel to the rotation axis between the moveable bearing ring and the stationary bearing ring,
wherein the slew bearing further comprises low friction pads arranged on the moveable bearing ring and corresponding low friction pads arranged on the stationary bearing ring to engage with the low friction pads on the moveable bearing ring, wherein the low friction pads of the moveable bearing ring are arranged parallel to the top roller raceway, and the low friction pads of the stationary bearing ring are arranged parallel to the bottom roller raceway in order to be able to transfer axial loads parallel to the rotation axis between the moveable bearing ring and the stationary bearing ring, characterized in that at least a first portion of the moveable bearing ring comprising the top roller raceway, after being disconnected from a second portion of the moveable bearing ring comprising the low friction pads, is moveable relative to the second portion in a direction parallel to the rotation axis between an operational position in which the top roller raceway engages with the rollers and a maintenance position in which the top roller raceway is at a distance from the rollers to allow inspection and/or maintenance, wherein in case the first portion is in the maintenance position, the axial loads at the location of the first portion are transferred between the moveable bearing ring and the stationary bearing ring via the low friction pads on the second portion of the moveable bearing ring and the corresponding low friction pads on the stationary bearing ring.

The invention will now be described in a non-limiting way by reference to the accompanying drawings in which like parts are indicated by like reference symbols, and in which.

Figure 1:
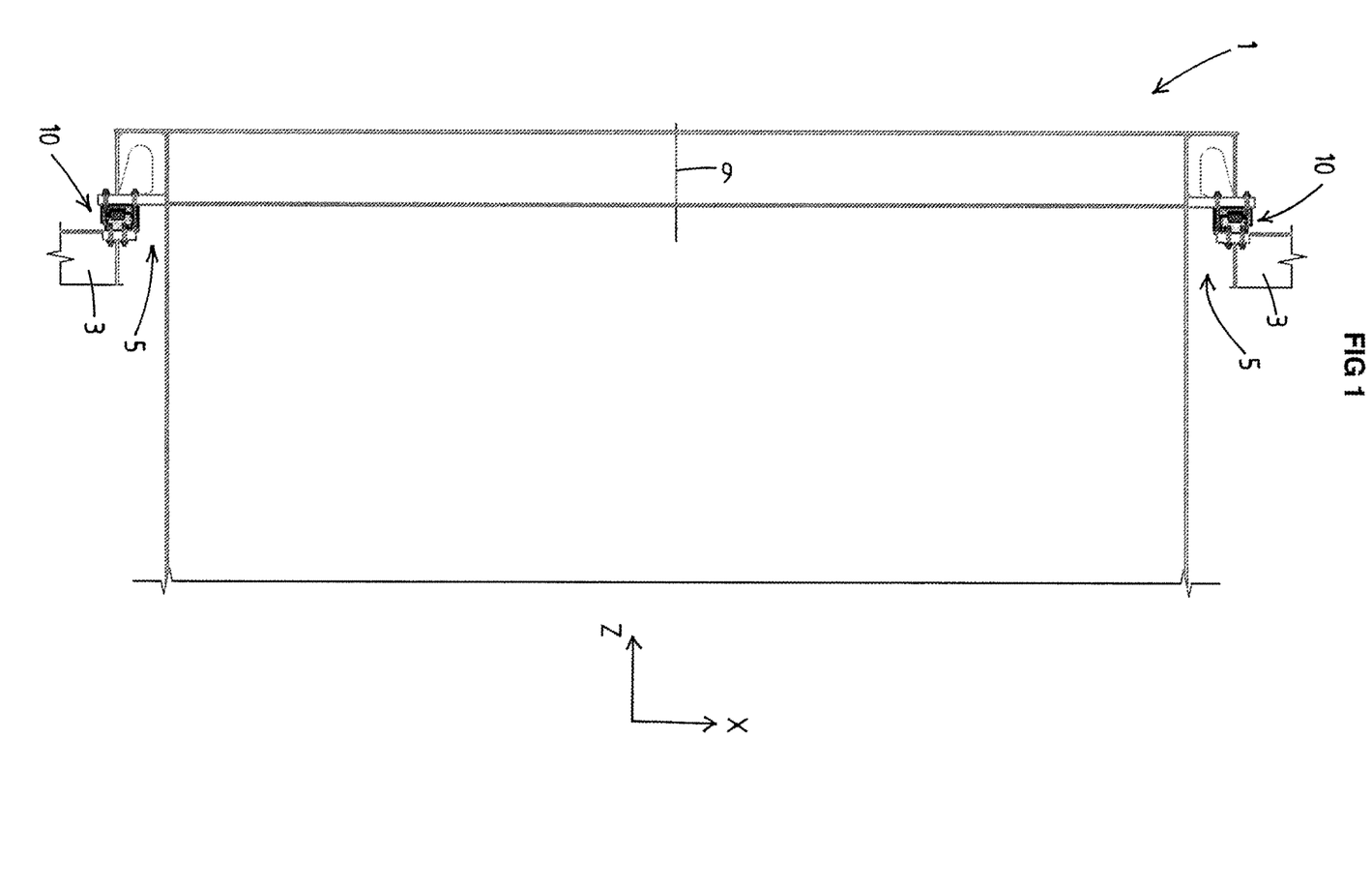
FIG. 1 depicts a cross section of a part of a vessel including a slew bearing according to an embodiment of the invention.

FIG. 1 depicts a part of a vessel 1 comprising a hull 3 with an opening 5 extending vertically through the hull 3. For clarity reasons, the drawing has been rotated 90 degrees such that the vertical extends parallel to the indicated Z-direction and the horizontal extends parallel to the indicated X-direction.

A turret 7 is provided in the opening 5 of the hull 3. Turrets are usually cylindrical elements generally used in floating production storage and offloading vessels. The vessel 1 is then equipped with hydrocarbon processing equipment for separation and treatment of crude oil, water and gasses, arriving on board from sub-sea oil wells via flexible pipelines connected to the turret.

The turret 7 can be moored to the seabed with chains, wires and anchors. A slew bearing 10 is provided between the hull 3 and the turret 7 to allow free and unrestricted 360° rotation of the vessel 1 around the turret 7. This allows weathervaning in which the vessel will normally lay head to the prevailing environment.

Figure 2:
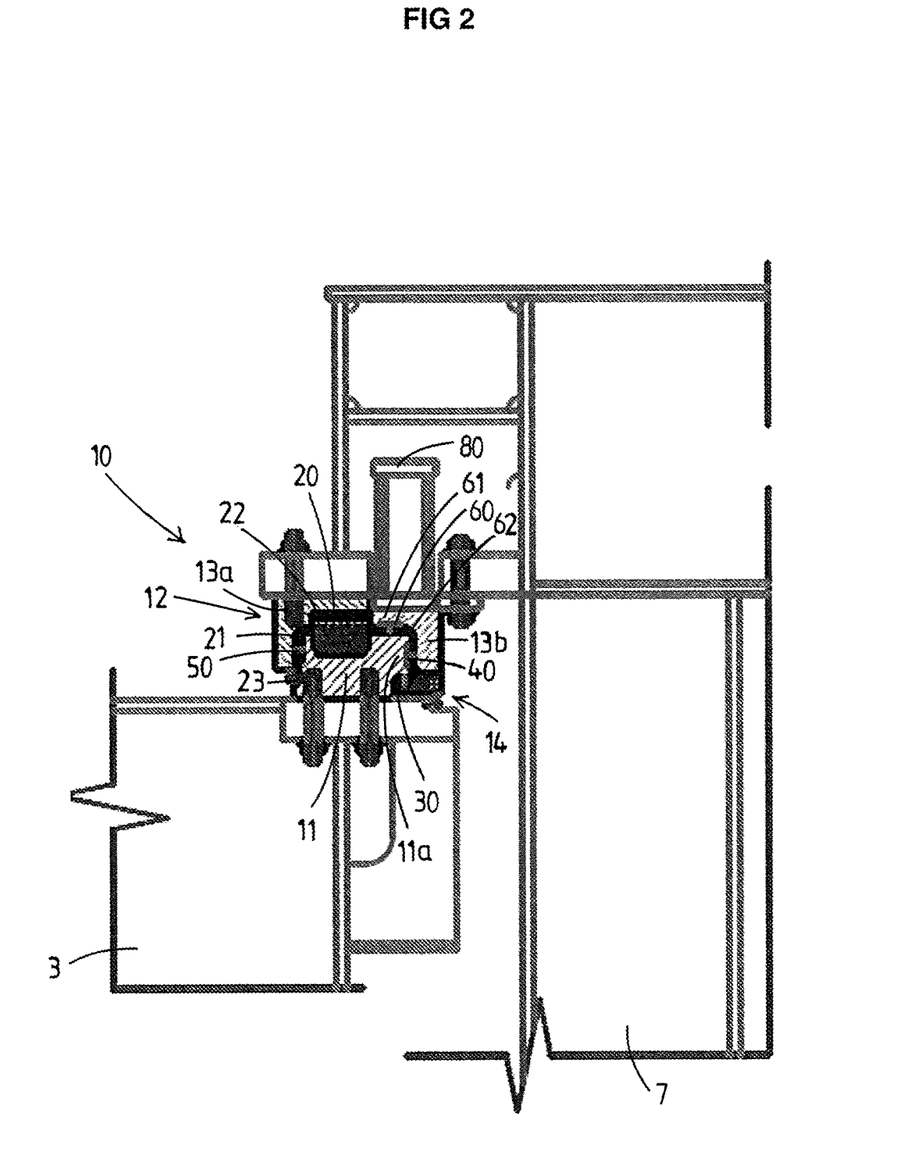
FIG. 2 depicts a cross section of the slew bearing of FIG. 1 during normal operation.

FIG. 2 depicts a cross section of the slew bearing 10 and part of the turret 7 and hull 3 during normal operation. The slew bearing 10 comprises a stationary bearing ring 11 fixed to the hull 3 which acts as base for the slew bearing 10. The slew bearing 10 further comprises a moveable bearing ring 12 fixed to the turret 7, which moveable bearing ring is concentric with the stationary bearing ring. The stationary bearing ring 11 and moveable bearing ring 12 are configured to enable rotation of the moveable bearing ring relative to the stationary bearing ring about a rotation axis 9 (see FIG. 1). The turret 7 is a moveable object to which the moveable bearing ring 12 is to be fixed.

The slew bearing 10 comprises a number of bearings to transfer loads that act in different directions between the moveable bearing ring and the stationary bearing. One of the provided bearings is an upper main axial bearing 20 allowing to transfer axial loads from the moveable bearing ring to the stationary bearing ring caused by the weight of the moveable bearing ring and turret 7 connected thereto.

The slew bearing further comprises a lower main axial bearing 30 allowing to transfer axial loads between the stationary bearing ring and moveable bearing ring preventing the moveable bearing ring to disengage from the stationary ring.

In order to transfer radial loads between the moveable bearing ring 12 and stationary bearing ring 11, the slew bearing 10 is provided with an inner main radial bearing 40 and an outer main radial bearing 50.

The upper main axial bearing 20 comprises a row of axial load rollers 21, which rollers 21 are arranged between a top roller raceway 22 and a bottom roller raceway 23, the top roller raceway 22 being connected to the moveable bearing ring 12 and the bottom roller raceway 23 being connected to the stationary bearing ring 11. The use of the rollers 21 allows to transfer relatively high loads without too much wear and heat generation.

The lower main axial bearing 30 and the inner and outer radial bearings 40, 50 can be embodied as roller bearings or plain bearings in which low-friction pads are engaged with each other and able to slide relative to each other. Plain bearings are much simpler in construction and therefore preferred when the loads are relatively low.

Figure 3:
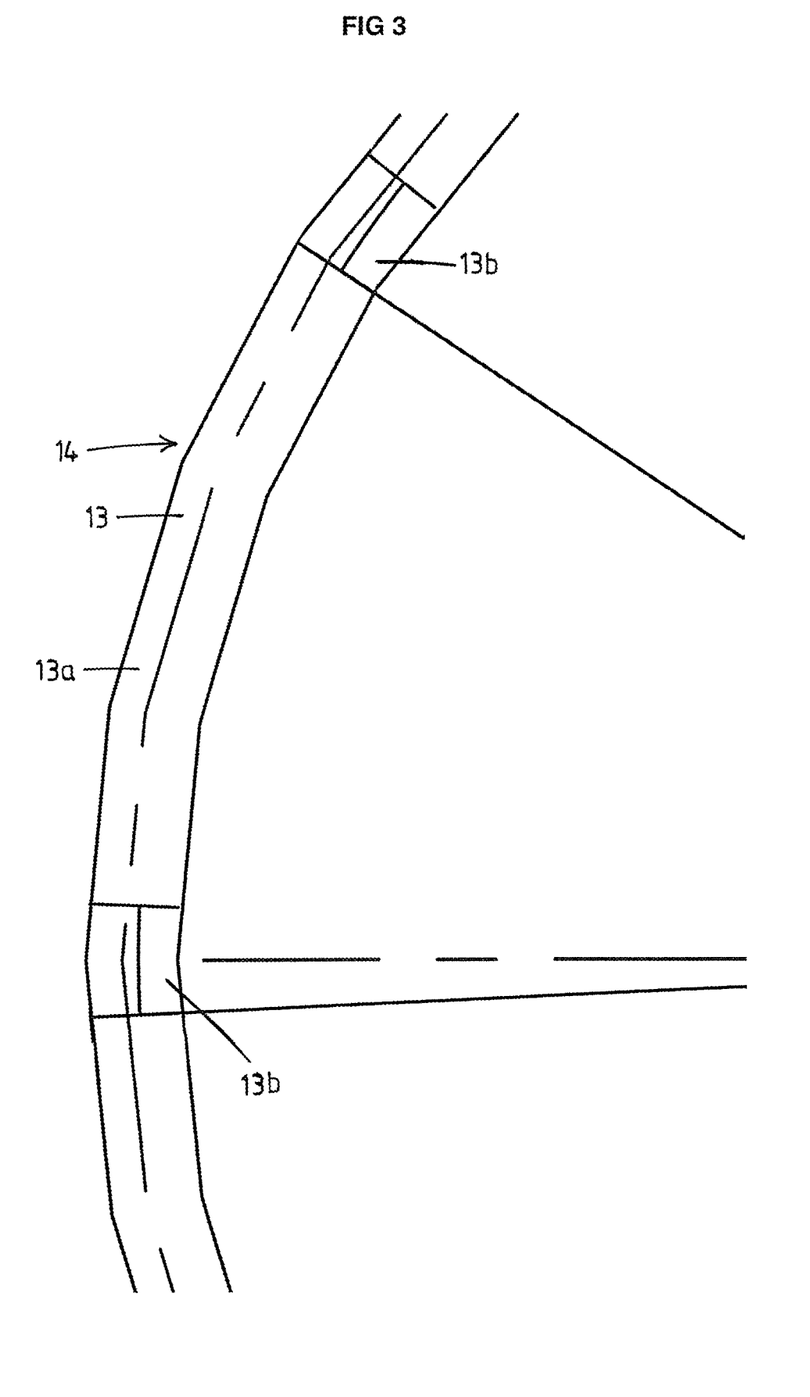
FIG. 3 depicts a schematic top view of a part of the slew bearing of FIG. 1.

In the particular embodiment shown, the moveable bearing ring 12 has a C-shaped cross section, comprising a top ring member 13, which can be best seen in FIG. 3 depicting a part of the slew bearing 10 from above, and a bottom ring member 14. The stationary bearing ring comprises a flange section 11a which extends in the radial direction, here, in the embodiment shown, the radially inward direction.

In this embodiment, the moveable bearing ring 12 comprises a main portion 13a as part of the top ring member 13 which includes the entire top roller raceway 22 of the upper main axial bearing 20.

The moveable bearing ring 12, in this case the top ring member 13 further comprises a plurality of auxiliary portions 13b distributed along the moveable bearing ring 12. The auxiliary portions 13b are provided with upper low-friction pads 61 as part of an upper auxiliary axial bearing 60. Corresponding lower low-friction pads 62 are arranged on the stationary bearing ring.

The upper auxiliary axial bearing 60 is provided in parallel to the upper main axial bearing 20 and also able to transfer axial loads between the moveable bearing ring and stationary bearing ring when the upper low-friction pads and lower low-friction pads engage with each other.

In this embodiment, during normal operation as shown in FIG. 2, the auxiliary portions 13b and the main portion 13a are connected to the turret 7 such that the main part of the axial loads is transferred between the moveable bearing ring and stationary bearing ring via the upper main axial bearing 20.

Figure 4:
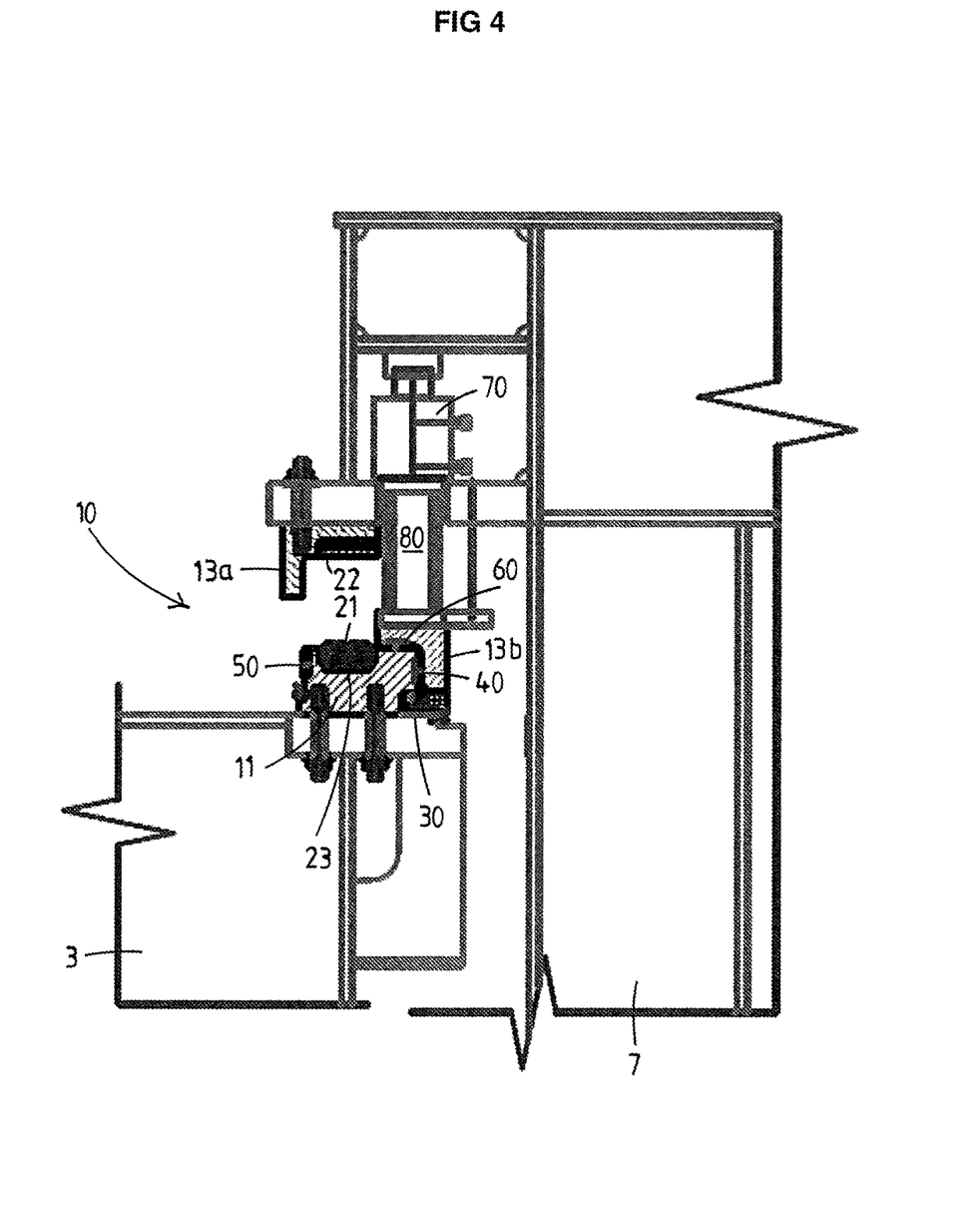
FIG. 4 depicts the cross section of FIG. 2 during maintenance or inspection.

The advantage of the auxiliary portions 13b and the upper auxiliary axial bearing will be apparent by reference to FIG. 4. In this FIG. 4, the auxiliary portions 13b have been disconnected from the turret 7 and an actuator device 70, e.g. a hydraulic jack system, is provided between the auxiliary portions 13b and the turret 7. By actuating the actuator device 70 it is possible to lift the turret 7 relative to the auxiliary portions 13b. Due to the fact that the main portion 13a is still connected to the turret, lifting the turret 7 will also lift the main portion 13a including top roller raceway 22 and allow access to the rollers 21.

In other words, the main portion 13a is moveable relative to the auxiliary portions 13b between an operational position as shown in FIG. 2, in which the top roller raceway of the main portion engages with axial load rollers to transfer axial loads between the moveable bearing ring and the stationary ring, and a maintenance position as shown in FIG. 4, in which the top roller raceway is disengaged from the axial load rollers.

In the maintenance position of the main portion 13a, the upper auxiliary axial bearing 60 will then take over the transfer of the axial loads between the moveable bearing ring and the stationary ring, so that the turret is still able to rotate relative to the hull. In other words, inspection and maintenance can be performed while the slew bearing is still fully functional albeit that it may be preferred to carry out inspection and/or maintenance during relatively mild and quiet weather conditions.

Depending on the available space and the dimensions of the actuator device 70 additional support elements may be used. In the embodiment of FIGS. 1-4, a support element 80 is provided on the auxiliary portions 13b for the actuator device 70 to reduce the available space between auxiliary portions and frame elements of the turret 7, thereby allowing to use a smaller actuator device.

As indicated by the FIGS. 2 and 4, the actuator device does not necessarily have to be provided permanently. It is well possible that during normal operation the actuator devices are not present and only installed when inspection and/or maintenance is required.

Although the invention has been described by reference to FIGS. 1-4 in which the slew bearing according to the invention is arranged between a turret and a hull of a vessel, it will be apparent that the invention can be used in many applications where a structure needs to be rotatable about a substantially vertical rotation axis. An example of such another application is a hoisting crane as shown in FIG. 5.

Figure 5:
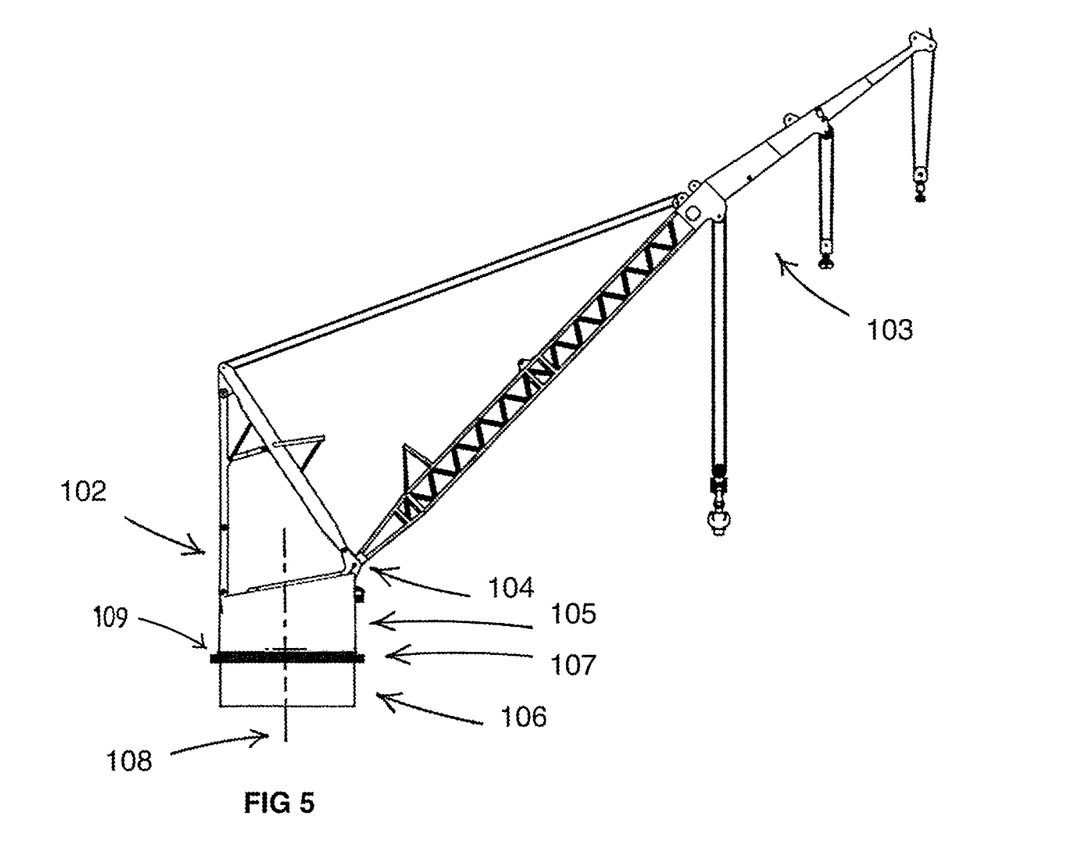
FIG. 5 depicts a hoisting crane according to an embodiment of the invention.

FIG. 5 shows a side view of a hoisting crane. The hoisting crane comprises a crane structure 102, which crane structure comprises a jib 103. In the embodiment shown, the jib 103 can be pivoted about a substantially horizontal pivot axis 104.

The crane structure 102 further comprises a crane housing 105 with a slew platform 109 at a lower side thereof. To support the crane structure 102 including crane housing 105, a base 106 is provided, which base can be secured to a vessel. To enable rotation of the crane structure 102 about a vertical axis, the hoisting crane is provided with a slew bearing 107 between the base 106 and the slew platform 109. The slew bearing 107 has a rotational axis 108 that extends in a substantially vertical direction and allows the slew platform 109, and thus the crane structure 102 comprising the jib 103, to be rotated relative to the base 106 about that rotational axis 108.

The slew bearing 107 can be similarly embodied as the slew bearing of FIGS. 1-4, with the difference that the moveable bearing ring is fixed to the slew platform 109 instead of the turret. Therefore the slew platform 109 is the moveable object to which the moveable bearing ring is to be fixed.

Figure 6:
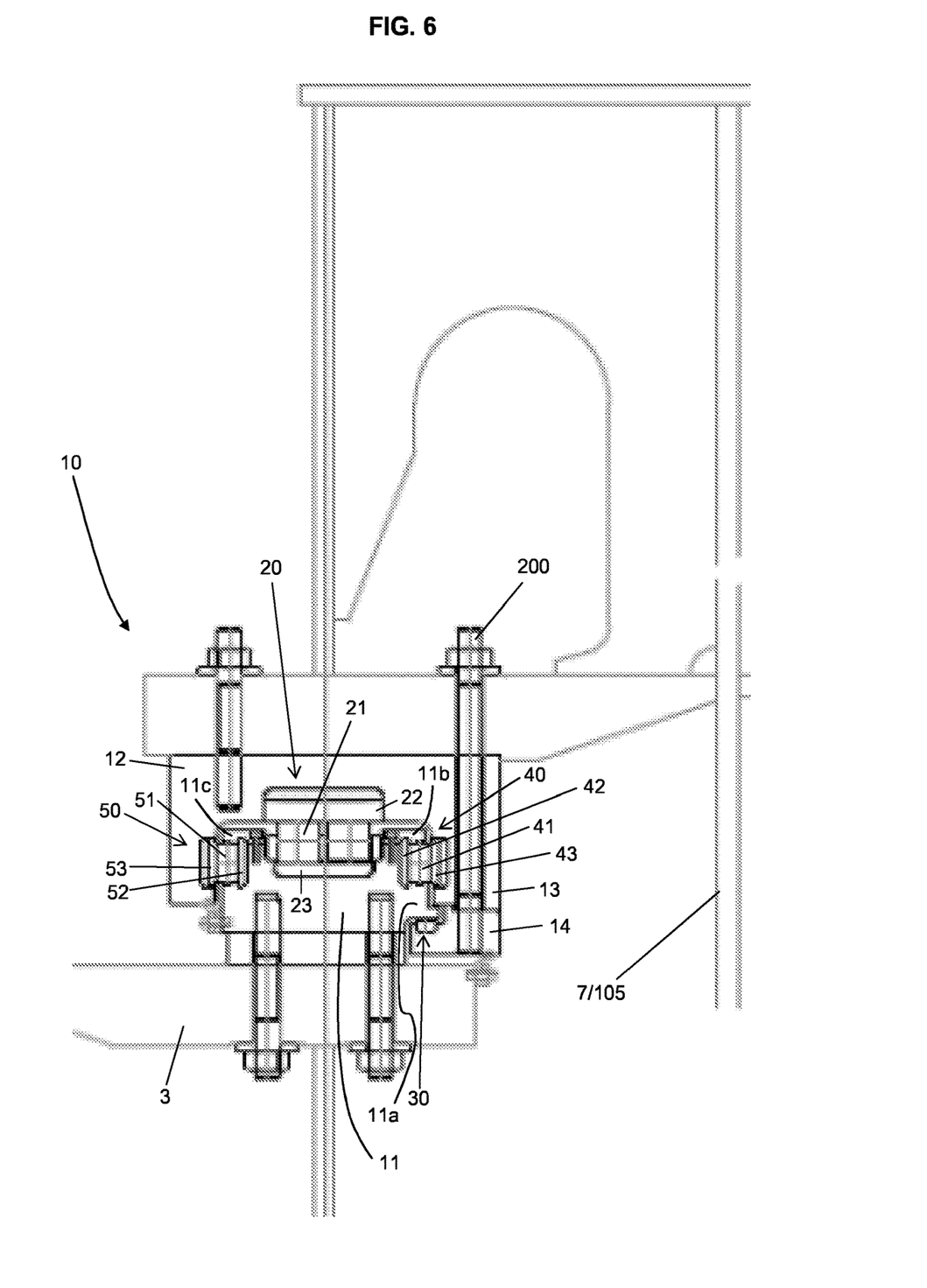
FIG. 6 depicts a cross section of a part of a vessel including a slew bearing according to another embodiment of the invention.

FIG. 6 depicts a cross section of a vessel with a slew bearing 10 according to another embodiment of the invention. The slew bearing 10 comprises a stationary bearing ring 11 fixed to a hull 3 of the vessel, which hull 3 acts as base for the slew bearing 10. The slew bearing 10 further comprises a moveable bearing ring 12 fixed to a turret 7 or slew platform 105 of a crane, which moveable bearing ring 12 is concentric with the stationary bearing ring 11. The stationary bearing ring 11 and the moveable bearing ring 12 are configured to enable rotation of the moveable bearing ring 12 relative to the stationary bearing ring 11 about a rotation axis.

The slew bearing 10 comprises a number of bearings to transfer loads that act in different directions between the moveable bearing ring 12 and the stationary bearing ring 11. One of the provided bearings is an upper main axial bearing 20 allowing to transfer axial loads from the moveable bearing ring 12 to the stationary bearing ring 11 caused by the weight of the moveable bearing ring 12 and structure 7 or 105 connected thereto.

The slew bearing further comprises a lower main axial bearing 30 allowing to transfer axial loads between the stationary bearing ring 11 and the moveable bearing ring 12 preventing the moveable bearing ring 12 to disengage from the stationary bearing ring 11.

In order to transfer radial loads between the moveable bearing ring 12 and the stationary bearing 11, the slew bearing 10 is provided with an inner main radial bearing 40 and an outer main radial bearing 50.

The upper main axial bearing 20 comprises a row of axial load rollers 21, which rollers 21 are arranged between a top roller raceway 22 and a bottom roller raceway 23, the top roller raceway 22 being connected to the moveable bearing ring 12 and the bottom roller raceway 23 being connected to the stationary bearing ring 11. The use of the rollers 21 allows to transfer relatively high loads without too much wear and heat generation.

The lower main axial bearing 30 can be embodied as roller bearings as well, but are in this embodiment embodied as plain bearings in which low-friction pads are engaged with each other and able to slide relative to each other. Plain bearings are much simpler in construction and therefore preferred when the expected loads are relatively low.

In the particular embodiment shown, the moveable bearing ring 12 has a C-shaped cross section, comprising a top ring member 13 and a bottom ring member 14. The stationary bearing ring 11 comprises a flange section 11a which extends in the radial direction, here, in the embodiment shown, the radially inward direction.

In this embodiment, the inner radial bearing 40 is embodied as a roller bearing comprising a row of radial load rollers 41, which rollers 41 are arranged between a first raceway 42 and a second raceway 43, wherein the first raceway 42 is connected to the stationary bearing ring 11 and the second raceway 43 is connected to the moveable bearing ring 12, in this case the top ring member 13 thereof.

In this embodiment, the out radial bearing 50 is embodied as a roller bearing comprising a row of radial load rollers 51, which rollers 51 are arranged between a first raceway 52 and a second raceway 53, wherein the first raceway 52 is connected to the stationary bearing ring 11 and the second raceway 53 is connected to the moveable bearing ring 12, in this case the top ring member 13 thereof.

As both the inner and outer radial bearings 40, 50 are embodied as roller bearing including rollers of which the respective rotation axes are oriented substantially vertical, there is the risk of rollers falling out of their intended position during assembly and maintenance. This has been solved in this embodiment by providing a respective removable cover element 11b, 11c. The rollers are then retained by the respective cover element 11b, 11c and a corresponding other portion of the stationary bearing ring 11, e.g. opposite the cover element 11b, 11c, to prevent them from inadvertently falling out of the stationary bearing ring 11. The cover portions 11b, 11c being removable allows for easy assembly and removal of the rollers in case of maintenance. As is preferred, the rollers may be provided with axial protrusions being received in corresponding recesses or grooves of said cover element 11b, 11c and said other portion of the stationary bearing ring 11. The recesses or grooves in the cover elements 11b, 11c may be referred to as upper grooves and the recesses or grooves in the other portion of the stationary bearing ring 11 may be referred to as lower grooves.

FIG. 6 depicts a cross section of the slew bearing 10 at a location where the entire top ring member 13 is made of one piece and connected to the bottom ring member 14 via bolts 200. This connection may not be intended to be released during regular maintenance. For regular maintenance there are maintenance sections provided, e.g. distributed along the entire circumference of the slew bearing, allowing to get access to the upper main axial bearing 20. A cross section of the slew bearing at such a maintenance section is depicted in FIG. 7 for an operational situation and in FIG. 8 for a maintenance situation.

At the maintenance sections, the moveable bearing ring 12 comprises a main portion 13a as part of the top ring member 13 which includes the top roller raceway 22 of the upper main axial bearing 20. The moveable bearing ring 12, in this case the top ring member 13 further comprises an auxiliary portion 13b. The auxiliary portion 13b is provided with upper low-friction pads 61 as part of an upper auxiliary axial bearing 60. Corresponding lower low-friction pads 62 are arranged on the stationary bearing ring 11. In this example, the cover element 11b also comprises the lower low-friction pads 62.

The upper auxiliary axial bearing 60 is provided in parallel to the upper main axial bearing 20 and also able to transfer axial loads between the moveable bearing ring 12 and the stationary bearing ring 11 when the upper low-friction pads 61 and lower low-friction pads 62 engage with each other.

Figure 7:
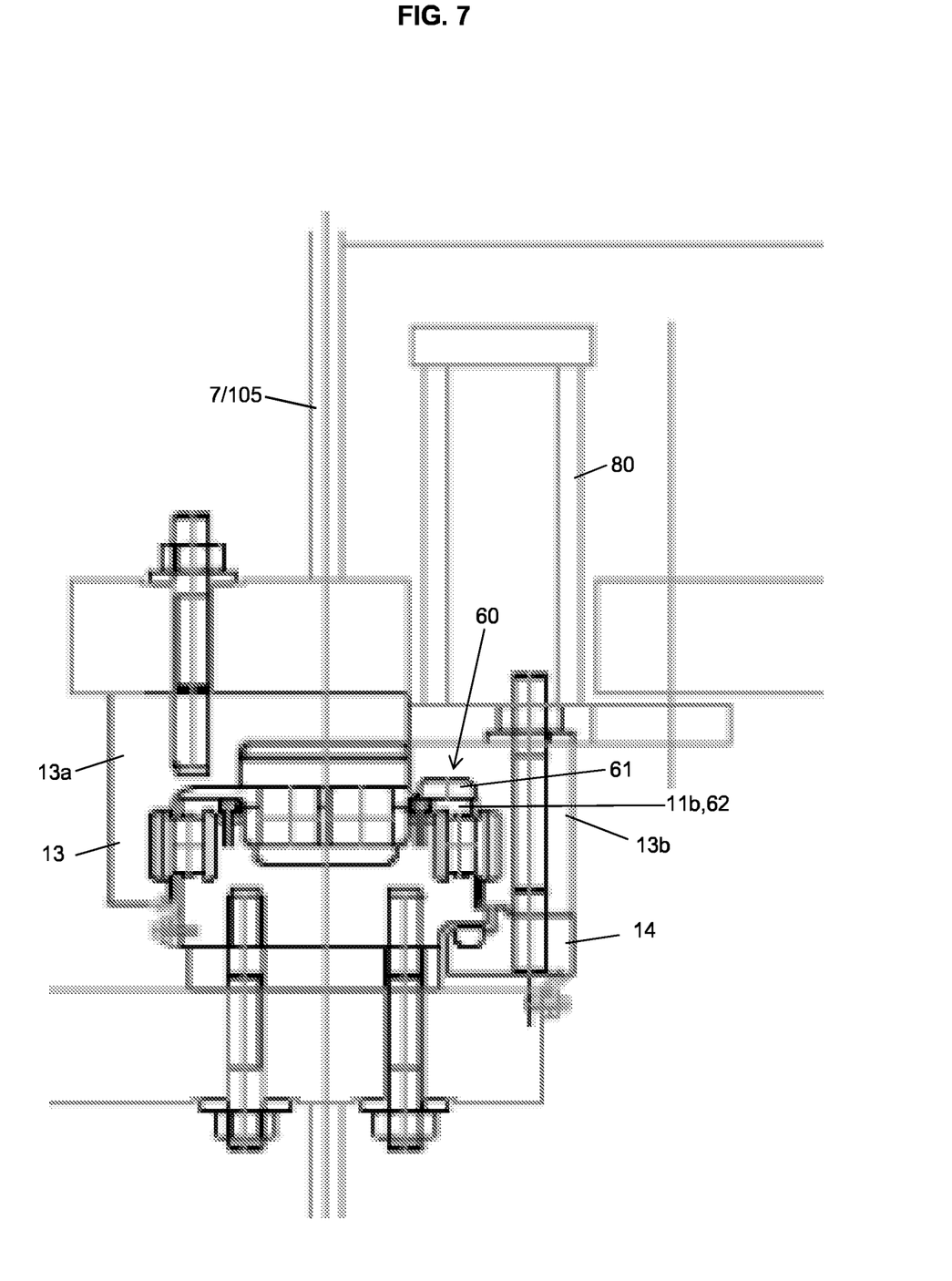
FIG. 7 depicts a cross section of the slew bearing of FIG. 6 during normal operation.

In the operational situation shown in FIG. 7, the main portion of the axial loads is transferred between the moveable bearing ring 12 and the stationary bearing ring 11 via the upper main axial bearing 20 shown in FIGS. 6 and 7.

Figure 8:
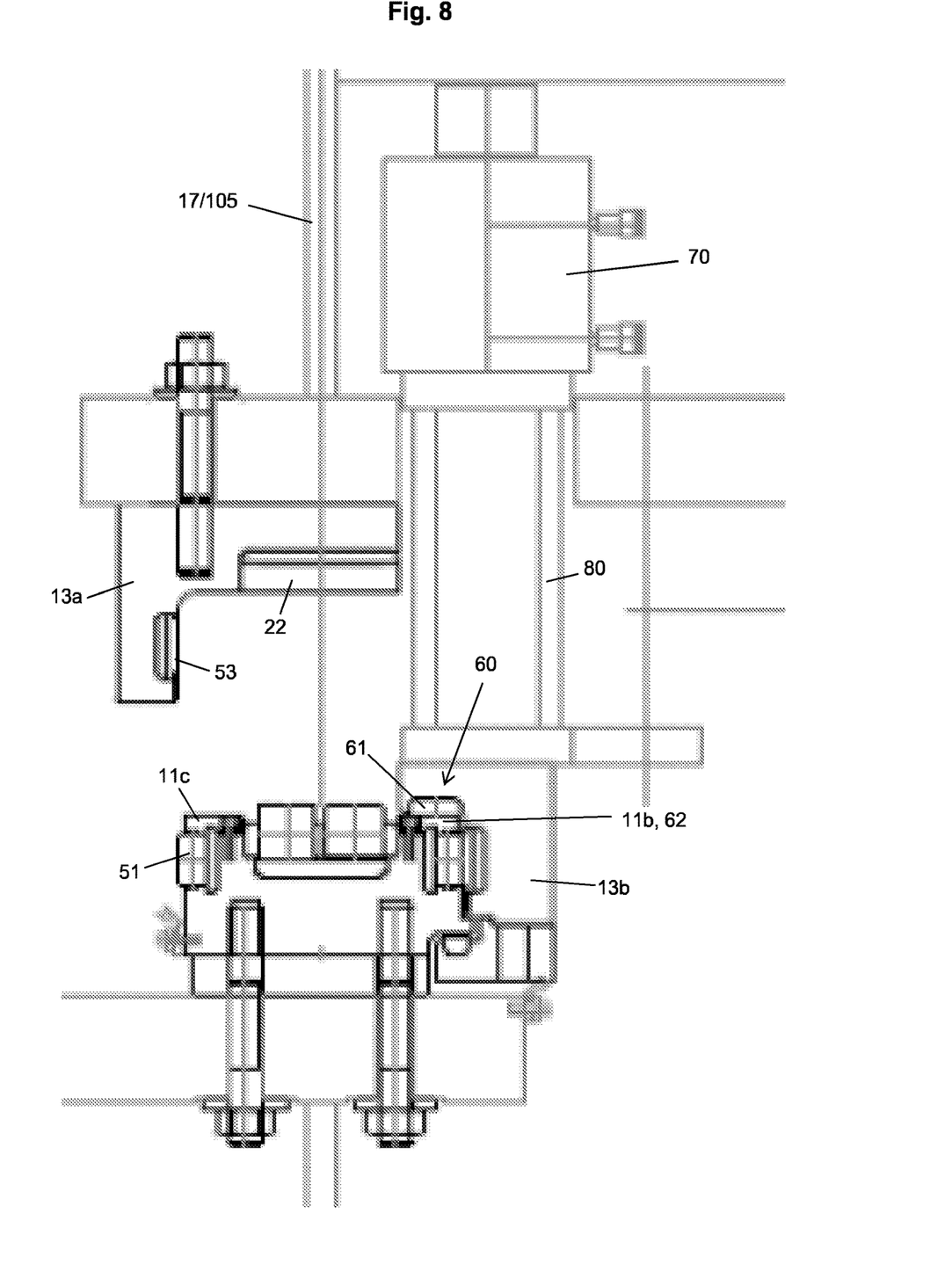
FIG. 8 depicts the cross section of FIG. 7 during maintenance or inspection.

In the maintenance situation shown in FIG. 8, the turret 7 or the slew platform 105 of a crane is lifted with respect to the auxiliary portion 13b using an actuator device 70, e.g. a hydraulic system, between the auxiliary portion 13b and the turret 7 or the slew platform 105. Due to the fact that the main portion 13a is still connected to the turret 7 or the slew platform 105, lifting the turret 7 or the slew platform 105 will also lift the main portion 13a including the top roller raceway 22 and allow to access the rollers 21.

In other words, the main portion 13a is moveable relative to the auxiliary portion 13b between an operational position as shown in FIG. 7, in which the top roller raceway of the main portion engages with axial load rollers to transfer axial loads between the moveable bearing ring and the stationary ring, and a maintenance position as shown in FIG. 8, in which the top roller raceway is disengaged from the axial load rollers.

In the maintenance position of the main portion 13a, the upper auxiliary bearing 60 will then take over the transfer of the axial loads between the moveable bearing ring and the stationary ring, so that the turret 7 or the slew platform 105 is still able to rotate relative to the hull of the vessel. In other words, inspection and maintenance can be performed while the slew bearing is still fully functional albeit that it may be preferred to carry out inspection and/or maintenance during relatively mild and quiet weather conditions.

Depending on the available space and the dimensions of the actuator device 70 additional support elements may be used. An example of such a support element 80 is depicted in the FIGS. 7 and 8 to reduce the available space between the auxiliary portion 13b and the frame elements of the turret 7 or the slew platform 105, thereby allowing to use a smaller actuator device 70.

In this embodiment it is assumed that at the sections depicted in FIG. 6, the top ring member 13 stays connected to the lower ring member 14, so that lifting the turret 7 or the slew platform 105 requires the turret 7 or the slew platform 105 to be temporarily be disconnected from the top ring member 13. In that case the top ring member 13 portion of FIG. 6 may be connected to the auxiliary portion 13b. However, in an alternative embodiment, the top ring member 13 stays connected to the turret 7 or the slew platform 105, so that the connection between the top ring member 13 and the lower ring member 14 needs to be disconnected to allow the turret 7 or the slew platform 105 to be lifted. In that case, the top ring member 13 portion of FIG. 6 may be connected to the main portion 13a. An advantage of the latter embodiment is that access is obtained to all rollers at once.

As shown in FIG. 8, lifting the main portion 13a also disengages the raceway 53 from the rollers 51. In absence of the raceway 53, the rollers 51 are kept in position by cover element 11c.

The invention claimed is:

1. A slew bearing comprising:
   a stationary bearing ring to be fixed to a base;
   a moveable bearing ring to be fixed to a moveable object and which moveable bearing ring is concentric with the stationary bearing ring,
   wherein the stationary bearing ring and the moveable bearing ring are configured to enable rotation of the moveable bearing ring relative to the stationary bearing ring about a rotation axis,
   wherein the slew bearing further comprises an upper main axial bearing having a row of axial load rollers, which rollers are arranged between a top roller raceway and a bottom roller raceway, said top roller raceway being connected to the moveable bearing ring and said bottom roller raceway being connected to the stationary bearing ring, and said rollers configured to transfer axial loads parallel to the rotation axis between the moveable bearing ring and the stationary bearing ring,
   wherein the slew bearing further comprises an upper auxiliary axial bearing having upper low-friction pads arranged on the moveable bearing ring and corresponding lower low-friction pads arranged on the stationary bearing ring to engage with the upper low-friction pads, wherein the upper low-friction pads are arranged parallel to the top roller raceway, and the lower low-friction pads are arranged parallel to the bottom roller raceway in order to transfer axial loads parallel to the rotation axis between the moveable bearing ring and the stationary bearing ring when the upper and lower low-friction pads engage with each other, wherein the moveable bearing ring comprises one or more main portions forming at least a part of the top roller raceway of the upper main axial bearing, and one or more corresponding auxiliary portions, each auxiliary portion forming at least a part of the upper low-friction pads, wherein the one or more main portions are moveable relative to the corresponding one or more auxiliary portions between an operational position, in which the at least part of the top roller raceway engages with the axial load rollers to transfer axial loads between the moveable bearing ring and the stationary ring, and a maintenance position, in which the at least part of the top roller raceway is disengaged from the axial load rollers, and wherein the one or more auxiliary portions are configured such that the at least part of the upper low-friction pads are engageable with the lower low-friction pads when the corresponding one or more main portions are in the maintenance position to transfer axial loads between the moveable bearing ring and the stationary ring.

2. The slew bearing according to claim 1, wherein an actuator device is provided to move the one or more main portions between the operational position and the maintenance position.

3. The slew bearing according to claim 1, wherein the moveable bearing ring comprises one of said one or more main portion and a plurality of said one or more auxiliary portions distributed evenly on the moveable bearing ring.

4. The slew bearing according to claim 1, wherein the one or more main portions form the entire top roller raceway.

5. The slew bearing according to claim 1, wherein the rollers are provided in a plurality of roller boxes.

6. The slew bearing according to claim 1, wherein at least one of the axial load rollers or a roller box holding a plurality of rollers is provided with a sensor for measuring a parameter or the condition of the slew bearing and a memory for storing measurement data that can be read-out by making a physical connection.

7. The slew bearing according to claim 1, comprising an inner main radial bearing arranged between the stationary bearing ring and the moveable bearing ring on an inner side of the stationary bearing ring.

8. The slew bearing according to claim 1, comprising an outer main radial bearing arranged between the stationary bearing ring and the moveable bearing ring on an outer side of the stationary bearing ring.

9. A hoisting crane comprising the slew bearing according to claim 1,
wherein the moveable object is a slew platform supporting a crane structure, and
wherein the slew bearing is arranged between the base and the slew platform, the stationary bearing ring being fixed to the base and the moveable bearing ring being fixed to the slew platform, thereby allowing the crane structure to rotate relative to the base about the rotation axis.

10. The hoisting crane according to claim 9, wherein the one or more main portions and the one or more auxiliary portions are fixed to the slew platform, wherein the one or more auxiliary portions can be disconnected from the slew platform, wherein an actuator device is provided between auxiliary portions and the slew platform to lift the slew platform including the one or more main portions when the one or more auxiliary portions are disconnected from the slew platform thereby allowing to move the one or more main portions between the operational position and the maintenance position.

11. A vessel comprising:
a hull provided with an opening extending vertically through the hull; and
the slew bearing according to claim 1,
wherein the moveable object is a turret extending in the opening of the hull, and
wherein the slew bearing is arranged between the hull and the turret, the stationary bearing ring being fixed to the hull and the moveable bearing ring being fixed to the turret, thereby allowing the turret to rotate relative to the hull about the rotation axis.

12. The vessel according to claim 11, wherein the one or more main portions and the one or more auxiliary portions are fixed to the turret, wherein the one or more auxiliary portions can be disconnected from the turret, wherein an actuator device is provided between auxiliary portions and the slew platform to lift the slew platform including the one or more main portions when the one or more auxiliary portions are disconnected from the slew platform thereby allowing to move the one or more main portions between the operational position and the maintenance position.

13. A method comprising the following steps:
providing a slew bearing according to claim 1, with the one or more main portions being directly or indirectly connected to the one or more auxiliary portions with the one or more main portions in the operational position;
disconnecting the one or more main portions from the one or more auxiliary portions; and
moving the one or more main portions to the maintenance position.

14. The method according to claim 13, further comprising the step of performing inspection and/or maintenance on the upper main axial bearing, and subsequently moving the one or more main portions to the operational position followed by connecting the one or more main portions to the one or more auxiliary portions.

15. The method according to claim 13, wherein the one or more main portions and the one or more auxiliary portions are connected to the moveable object, wherein disconnecting the one or more main portions from the one or more auxiliary portions comprises disconnecting the one or more auxiliary portions from the moveable object, and wherein moving the one or more main portions to the maintenance position is carried out by providing an actuator device between the disconnected one or more auxiliary portions and moving the moveable —object with the actuator device.

* * * * *